United States Patent [19]
Edman

[11] Patent Number: 5,542,483
[45] Date of Patent: Aug. 6, 1996

[54] METHOD FOR OVERBURDEN DRILLING, CASING SHOE AND CASING TUBE FOR THE METHOD, AND COUPLING ELEMENT FOR THE CASING TUBES

[76] Inventor: Knut O. Edman, Höglidsvägen 30, S-135 50 Tyrcsö, Sweden

[21] Appl. No.: 290,772
[22] PCT Filed: Feb. 25, 1993
[86] PCT No.: PCT/SE93/00158
§ 371 Date: Nov. 28, 1994
§ 102(e) Date: Nov. 28, 1994
[87] PCT Pub. No.: WO93/17215
PCT Pub. Date: Sep. 2, 1993

[30] Foreign Application Priority Data
Feb. 25, 1992 [SE] Sweden ................... 9200563

[51] Int. Cl.⁶ ............................................. E21B 17/08
[52] U.S. Cl. ......................... 175/257; 267/273; 285/908
[58] Field of Search ........................... 175/22, 23, 257, 175/262, 57; 166/242; 267/273, 274, 268; 285/423, 908

[56] References Cited

U.S. PATENT DOCUMENTS

| 3,033,919 | 5/1962 | Aschinger | 264/273 X |
| 4,168,393 | 9/1979 | Silva | 264/273 X |
| 4,926,909 | 5/1990 | Salinas | 285/908 X |
| 5,110,382 | 5/1992 | Terry et al. | 264/273 X |

FOREIGN PATENT DOCUMENTS 420462  8/1993  Germany.

*Primary Examiner*—David J. Bagnell
*Attorney, Agent, or Firm*—Birch, Stewart, Kolasch & Birch, LLP

[57] ABSTRACT

When drilling in soil and simultaneous loading of casing tube, it is desirable to be able to use casing tubes of plastic material such as PEH-plastic. This is made possible by a special design of a casing shoe giving a strong joint between the casing shoe and the casing tube. The casing shoe is made of metal and has a part which is perforated with holes filled with the plastic material. Tube couplings between the casing tubes can also be joined to the tubes in the same way as the casing shoe. In other words, they can be made of metal and each have one part perforated with holes filled with the plastic material.

9 Claims, 3 Drawing Sheets

1

METHOD FOR OVERBURDEN DRILLING, CASING SHOE AND CASING TUBE FOR THE METHOD, AND COUPLING ELEMENT FOR THE CASING TUBES

FIELD OF THE INVENTION

The present invention refers to a method for overburden drilling with simultaneous loading of casing tube, a casing shoe and a casing tube for the method and a coupling element for casing tubes designed to be used with the method.

DESCRIPTION OF THE BACKGROUND ART

When drilling in soil, a central pilot drill bit is used together with a reamer drill bit so arranged that it can be thrown out eccentrically in relation to the pilot drill bit and expand the hole drilled by it. Thereby the bore will be of a dimension enough to give room not only for the pilot drill bit with the reamer drill bit in its inner position but also for a casing tube brought down in the hole at the same time as the hole is drilled. The casing tube is driven downwards with the drill bit through a casing shoe welded to the end of the casing tube and influenced by the percussive drill hammer. The casing tubes usually consist of three meters in length of steel welded together as drilling and the tube is driven downwards to a suitable extent.

One problem when dealing with the casing tubes is their weight. One further problem is the possibility of corrosion, which in some cases causes the exchange of them to plastic tubes after the drilling, a circumstantial and laborious procedure.

SUMMARY OF THE INVENTION

One object of the present invention is to eliminate the exchange of casing tubes and one further object is to facilitate the handling of casing tubes during drilling. These and other objects are fulfilled by using casing tubes of plastic material from the beginning, which in turn according to the invention is made possible by a special design of the casing shoe and of coupling elements for the casing tubes giving a strong anchoring in the plastic material.

Still one further object of the present invention is to achieve a joint of the casing tubes of plastic material in a simple way. This can be done by joining metal elements to the ends of the casing tubes in the some way as the casing shoe, the metal elements supporting tube couplings, for example of the threaded type.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be described more in detail referring to the drawings which are given by way of illustration only, and thus are not limitative of the present invention, and in which.

DETAILED DESCRIPTION OF THE PREFERRED EMBODIMENTS

Figure 1:
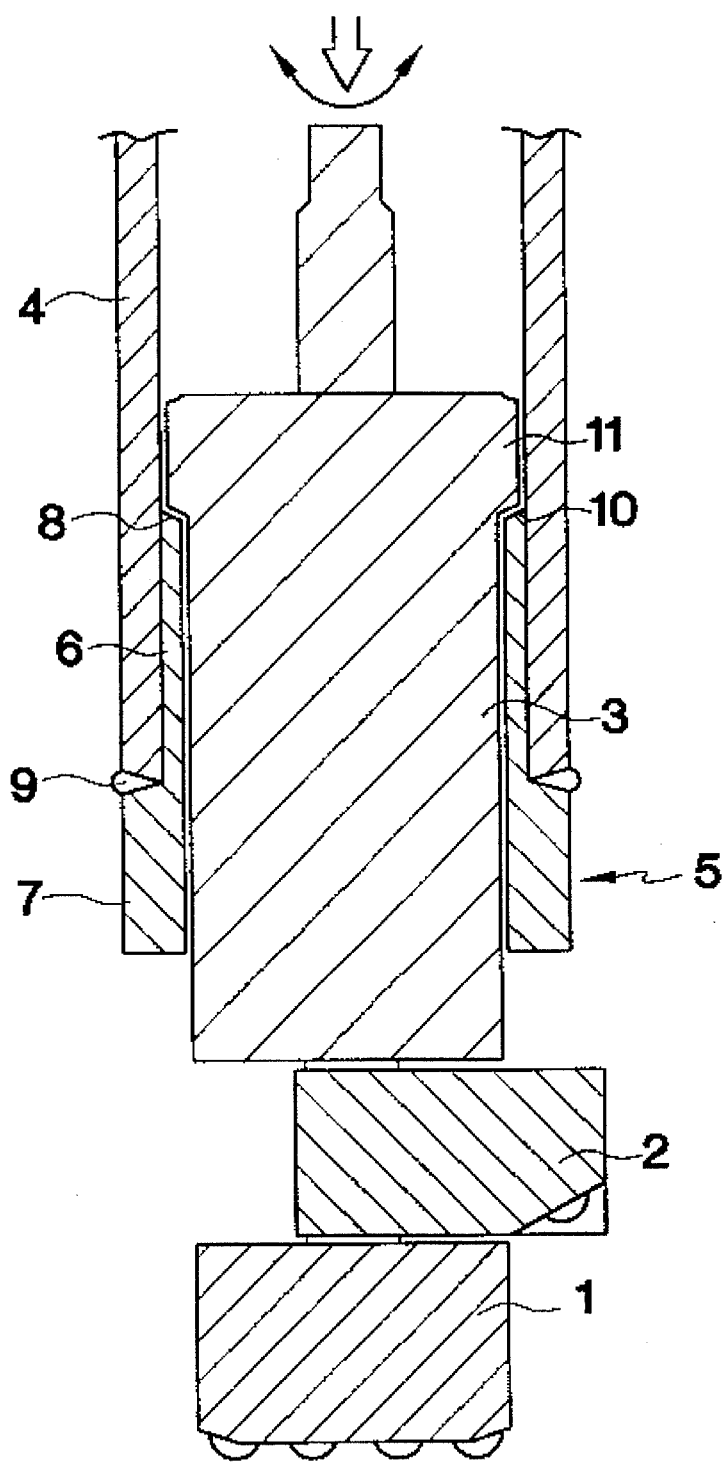
FIG. 1 shows schematic and partly broken through an example of a known design of the parts at the drill bit of a machinery for simultaneous drilling and casing of the bore.

The drill bit in FIG. 1 consists in a known manner of a pilot drill bit 1, a reamer drill bit 2 and a guide 3 for a percussive drill hammer (not shown). The drill bits 1 and 2 and the guide 3 can be rotated and axially influenced by the percussive drill hammer. A casing shoe 5 consists of an upper part 6 and a lower part 7, both cylindrical. The inside diameters of parts 6 and 7 are alike and adapted to the outside diameter of the lower part of the guide 3. The outside diameter of the upper part 6 of the casing shoe is adapted to the inside diameter of the casing tube while the outside diameter of the lower part 7 is substantially the same as the outside diameter of the casing tube 4. The upper part 6 of the casing shoe is ended upwards with a shoulder 8, against which the guide 3 transfers the percussions of the hammer through a corresponding shoulder 10 of an enlarged part 11 of the guide 3. The casing tube 4 is pulled with the casing shoe when it is thrown downwards, the casing tube being welded together through a welding seam 9 at the upper end of the lower part 7.

Figure 2:
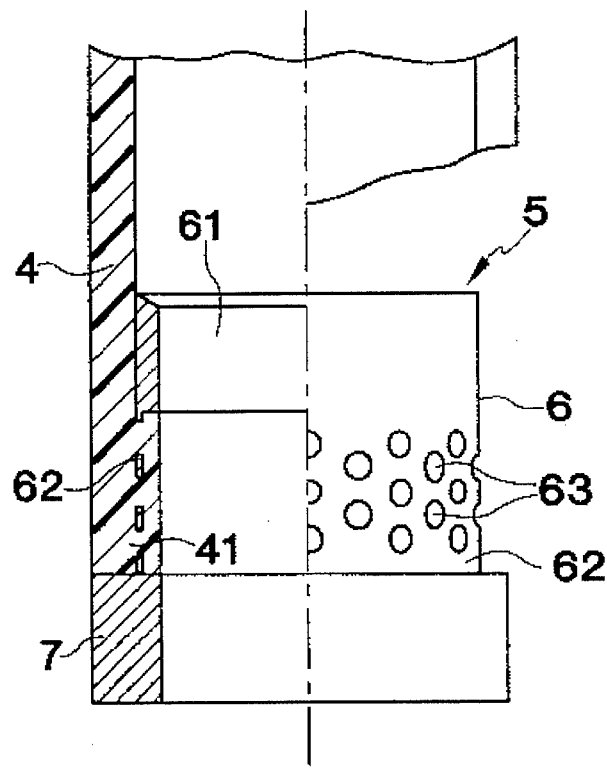
FIGS. 2 and 3 shows partly in section the design of a casing shoe according to the invention in two embodiments.

FIG. 2 shows a casing tube according to the invention partly in section. This is intended to be used instead of the casing shoe according to FIG. 1 in order to make possible casing with casing tube of plastic material or other materials which cannot be welded to a conventional casing shoe. The casing shoe 5 according to the invention has a lower part 7 which is essentially corresponding to this part of a conventional casing shoe. The upper part 6, however, is divided in one upper section 61 and one lower section 62, the upper section 61, as all of the upper parts of a conventional casing shoe, has an outside diameter adapted to the inside diameter of the casing tube 4 and an inside diameter equal to that of the lower part 7. The lower section 62 has essentially the same outside diameter as the upper section 61 but considerably less thickness. The lower section 62 is also perforated with holes 63, essentially with an even distribution. The holes 63 are circular in the drawing, but they can also be made way with a different shape and size. The thickness of the section 62 can also be varying and for example thicker around the circumference of the holes. The object of the holes is to cause a strong anchoring of the casing shoe on the casing tube 4 by way that it is connected through the holes with an essentially tube shaped part 41 filling the space inside the inner surface of the lower section 62 to a substantially even inside diameter of the whole casing shoe.

Figure 3:
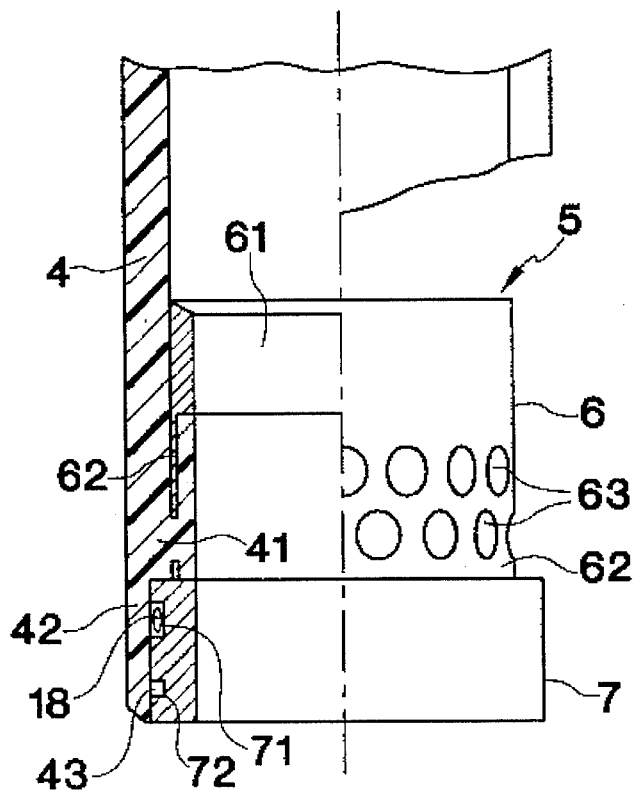

Another embodiment of the casing shoe 5 and the tube 4 is shown in FIG. 3. It corresponds to the embodiment of FIG. 2 except at the lower part 7 of the casing shoe, which is given a smaller outside diameter whereby a thin part 42 of the tube 4 surrounds it. The lower part 7 of the casing shoe is also shaped with a groove 72 at its lower part, in which plastic material 43 united to the thin part 42 is fitted. One more annular groove 71 is arranged, containing a packing ring 18, preferably made of a material which expands in contact with water.

The casing shoe according to the invention is preferably joined to a suitable length of a casing tube to a well connected unit with a suitable heat treatment. During drilling the casing tube may be lengthened by way of a modified mirror welding or by joining with some other conventional method. A suitable material for the casing tubes is PEH (high-density polyeten).

Figure 4:
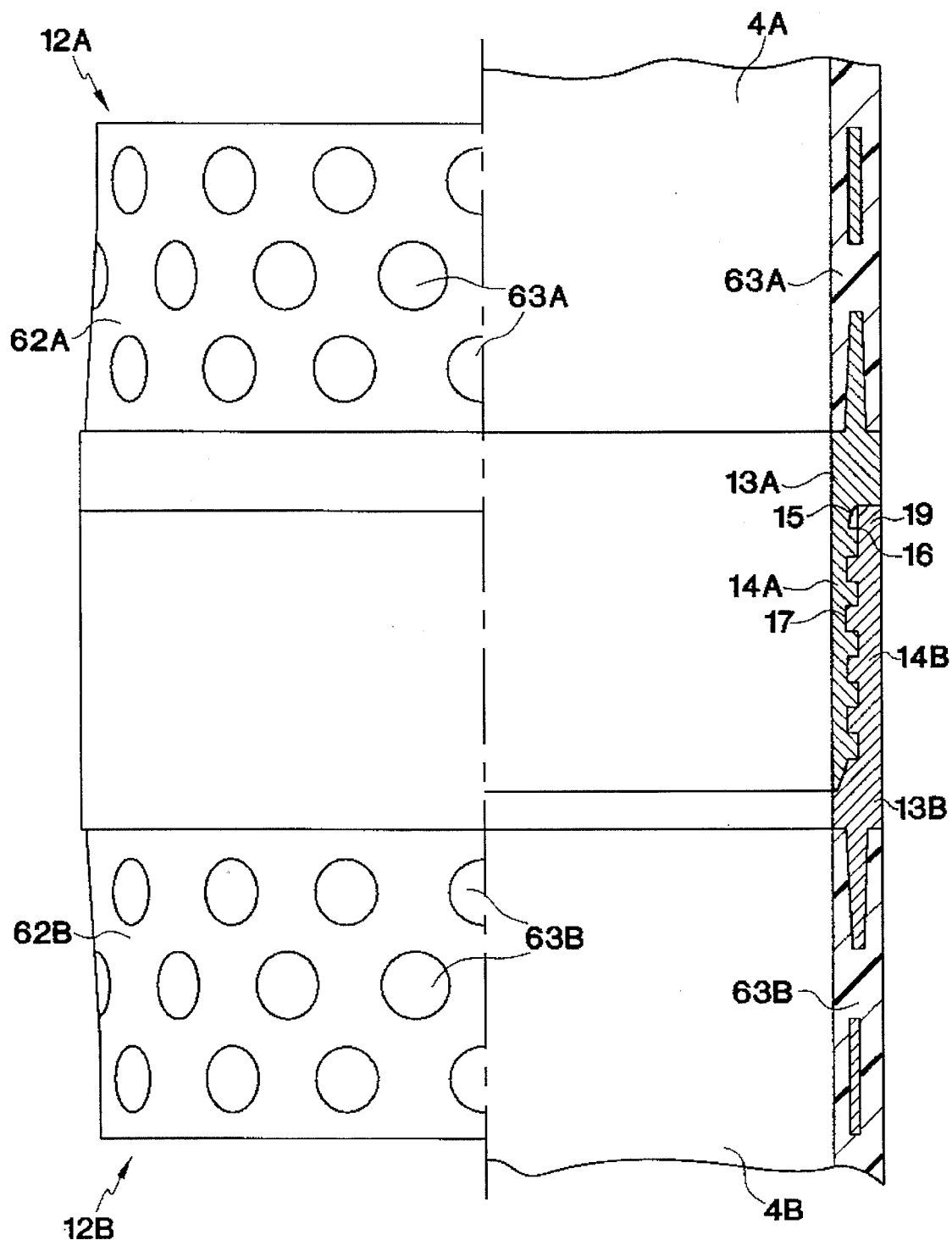
FIG. 4 shows casing tubes with tube couplings according to the invention.

The connection of the lengths of casing tubes can also be done by means of equipping them at the ends with metal elements anchored at the tube end in the same way as the casing shoe. Accordingly, FIG. 4 shows two tubes 4A and 4B, each at the end connected with metal element 12A and 12B, respectively. For the sake of simplicity, a section of a part around a tube joint is shown on the right half of the drawing, while on the left half the tubes 4A and 4B are omitted in Order to make the detailed design of the metal elements 12A and 12B clear. As with the casing shoe the metal elements 12A and 12B are united to the actual tube by means of tube formed parts 62A and 62B, respectively, perforated by holes 63A and 63B, respectively, filled by the plastic material. Preferably the tube formed parts 62A and 63B have a diameter which is in the middle between the inside and the outside diameter for the tubes 4A and 4B. They are designed with a thickness of material which is lowest at the outer end and increasing towards the end of the tube and the other parts of the metal element in order to achieve good strength. The metal elements 12A and 12B may, for connection of the tube ends, be given a final shape with different types of tube couplings, for example of the bayonet type. One requirement when used as a casing tube for drilling is that both inside and outside surfaces at the joint are smooth and with no projections. As is shown in the embodiment in the figure, each metal element has a part of even thickness 13A and 13B, respectively, closest to the end of the tube, after which follows a threaded part 14A and 14B, respectively. Thus, one of the metal elements 12A has an outer part with an even inside diameter and an externally threaded part 14A while the other metal element 12B has an outer part with an even outside diameter and an internally threaded part 14B. The threads 17 are preferably of the trapezoid type. A packing 16 in the form of an O-ring or the like may be arranged in a groove 15 between the part of even thickness 13A and the outside thread 14A for tightening against a part 19 outside the threaded part 14B.

As the size, shape and distribution of the holes 63, 63A and 63B can be varied much within the scope of the invention, the number of holes and the sum of their areas can also be varied. In a preferred embodiment, however, the sum of the areas of the holed is at least equal to the cross section area of the casing tube 4.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A method for overburden drilling with simultaneous loading of casing tubes with a percussive drill hammer to influence a casing shoe connected with a lower end of one of the casing tubes, the method comprising the steps of:

using plastic material for the casing tubes; and providing metal perforated with holes for the casing shoe, the holes being filled with the plastic material.

2. The method according to claim 1, further comprising the steps of:

equipping the casing shoe with a perforated part which is relatively thin and cylindrical;

connecting the casing tube surrounding the perforated part with a tube-formed part of the same material through the holes in the perforated part.

3. A casing shoe for casing tubes comprising a lower, cylindrical part with an outside diameter substantially corresponding to that of the casing tube and an upper cylindrical part with an outside diameter substantially corresponding to the inside diameter of the casing tube, the upper cylindrical part having at least one part perforated by holes and having a larger inside diameter than the rest of the casing shoe.

4. The casing shoe according to claim 3, wherein the upper cylindrical part is surrounded by the end of the casing tube of plastic material, the inner surface of the perforated part being filled out to a same inside diameter as the rest of the casing shoe with the same material as that of the casing tube and the casing shoe being thereby connected with the casing tube through the holes.

5. The casing shoe according to claim 4, wherein a sum of areas of the holes is at least equal to a cross sectional area of the casing tube.

6. The casing shoe according to claim 3, wherein a sum of areas of the holes is at least equal to a cross sectional area of the casing tube.

7. A tube of plastic material for boring comprising at least one end being connected to a metal element, the metal element having a tube formed part perforated with holes, the holes of the tube formed part being filled with plastic material to anchor the metal element in the tube, the metal element being a casing shoe.

8. A tube of plastic material for boring comprising at least one end being connected to a metal element, the metal element having a tube formed part perforated with holes, the holes of the tube formed part being filled with plastic material to anchor the metal element in the tube, the metal element includes a tube coupling device.

9. A metal element for a joint with a tube made of plastic material, the metal element comprising a tube coupling and at least one substantially tube formed part perforated with holes for joining the tube and the metal element, the material of the tube surrounds the tube formed part of the metal element and fills the holes in the tube formed part, the tube formed part being thickest at an end facing the tube coupling and tapering off to the other end.

* * * * *